US010089035B1

United States Patent
Bono et al.

(10) Patent No.: US 10,089,035 B1
(45) Date of Patent: *Oct. 2, 2018

(54) BLOCK STORAGE TRANSPARENT PLATFORM MIGRATION

(71) Applicant: EMC IP Holding Company LLC, Hopkinton, MA (US)

(72) Inventors: Jean-Pierre Bono, Westborough, MA (US); Scott W. Keaney, Dedham, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/065,688

(22) Filed: Oct. 29, 2013

(51) Int. Cl.
*G06F 12/00* (2006.01)
*G06F 3/06* (2006.01)

(52) U.S. Cl.
CPC .......... *G06F 3/0647* (2013.01); *G06F 3/067* (2013.01); *G06F 3/0619* (2013.01)

(58) Field of Classification Search
CPC ....... G06F 3/067; G06F 3/0647; G06F 3/0635
USPC ........................................................ 711/162
See application file for complete search history.

(56) References Cited

U.S. PATENT DOCUMENTS

| 8,261,068 | B1 * | 9/2012 | Raizen et al. ............... 713/165 |
| 2003/0101228 | A1 * | 5/2003 | Busser .................. G06F 3/0601 709/214 |
| 2007/0208882 | A1 * | 9/2007 | Corrigan ................. G06F 9/544 710/3 |
| 2008/0183777 | A1 * | 7/2008 | Xi et al. ....................... 707/205 |
| 2010/0049917 | A1 * | 2/2010 | Kono et al. ................... 711/114 |
| 2012/0166736 | A1 * | 6/2012 | Yamamoto et al. .......... 711/147 |
| 2013/0173804 | A1 * | 7/2013 | Murthy ................. G06F 9/5022 709/226 |

* cited by examiner

Primary Examiner — Prasith Thammavong
(74) Attorney, Agent, or Firm — Krishnendu Gupta; Jason A. Reyes (57) ABSTRACT

There is disclosed a method for managing data storage. In one embodiment, the method comprises operating a storage processor of a first data storage system at a first location. The storage processor comprising a first distributed data manager and an IO stack arranged therein such that distributed data manager can receive a LUN outputted by IO stack. The method also comprises initiating a communication between first distributed data manager and second distributed data manager associated with a second data storage system at a second location. The method further comprises migrating stored data on first data storage system to second data storage system and providing LUN information associated with stored data to second data storage system such that a LUN identify of migrated data stored on second data storage system is similar to a LUN identity of corresponding stored data on first data storage system.

15 Claims, 5 Drawing Sheets

BLOCK STORAGE TRANSPARENT PLATFORM MIGRATION

TECHNICAL FIELD

The invention relates generally to managing data storage, and more particularly to migrating data between data storage systems at different locations.

BACKGROUND OF THE INVENTION

Block-based data storage systems conventionally include programming and hardware structures to provide block-based access to storage volumes. Such systems may support Fibre Channel, iSCSI (Internet Small Computer System Interface), and/or other block-based protocols. With block-based protocols, a data storage system may receive IO (input/output) requests from "hosts," i.e., computing devices accessing the data storage system, where the IO requests specify locations to be read from or written to in the form of LUN identifiers (logical unit number, or volume) and particular offset ranges relative to the LUN. IOs that specify read requests map the specified LUNs and offsets to particular locations on disk drives or electronic flash drives, reads the data stored at the mapped locations, and returns the data to the hosts. IOs that specify write requests perform similar mappings, but write the data to the designated locations. The IO requests may return results indicating whether the write requests succeeded or failed. An example of a block-based data storage system is the CLARiiON® system from EMC Corporation of Hopkinton, Mass.

File-based data storage systems include programming and hardware structures to provide file-based access to file systems. File-based data storage systems are sometimes referred to as NAS (Network Attached Storage) systems. Such systems typically support NFS (Network File System), CIFS (Common Internet File System), SMB (Server Message Block), and/or other file-based protocols. With file-based protocols, hosts can issue read and write IO requests by specifying particular file systems, paths, and file names. Internally to the data storage system, file system directories map the files specified by the host IOs to particular sets of blocks on internal volumes, which themselves are derived from disk drives or electronic flash drives. The data storage system accesses the mapped locations and performs the requested reads or writes. An example of a file-based data storage system is the Celerra® system from EMC Corporation of Hopkinton, Mass.

Distributed storage system equipment provides what may be known as data federation. An example of such data federation equipment for block-based distributed storage is the VPLEX® system from EMC Corporation of Hopkinton, Mass.

SUMMARY OF THE INVENTION

There is disclosed a computer-implemented method, comprising: operating a first storage processor of a first data storage system at a first location, the first storage processor comprising a first distributed data manager and a first IO stack arranged within the first storage processor such that the first distributed data manager can receive a LUN outputted by the first IO stack; initiating a communication between the first distributed data manager and a second distributed data manager associated with a second data storage system at a second location; in response to establishing a communication between the first and second distributed data managers, migrating stored data on the first data storage system to the second data storage system; and in response to establishing a communication between the first and second distributed data managers, providing LUN information associated with the stored data to the second data storage system such that a LUN identify of the migrated data stored on the second data storage system is similar to a LUN identity of the corresponding stored data on the first data storage system.

There is also disclosed an apparatus, comprising: one or more processors; and a computer-readable medium storing instructions for execution by the one or more processors, the instructions comprising instructions to: operate a first storage processor of a first data storage system at a first location, the first storage processor comprising a first distributed data manager and a first IO stack arranged within the first storage processor such that the first distributed data manager can receive a LUN outputted by the first IO stack; initiate a communication between the first distributed data manager and a second distributed data manager associated with a second data storage system at a second location; in response to establishing a communication between the first and second distributed data managers, migrate stored data on the first data storage system to the second data storage system; and in response to establishing a communication between the first and second distributed data managers, providing LUN information associated with the stored data to the second data storage system such that a LUN identify of the migrated data stored on the second data storage system is similar to a LUN identity of the corresponding stored data on the first data storage system.

There is further disclosed a computer program product having a non-transitory computer-readable medium storing instructions, the instructions, when carried out by one or more processors, causing the one or more processors to perform a method of: operating a first storage processor of a first data storage system at a first location, the first storage processor comprising a first distributed data manager and a first IO stack arranged within the first storage processor such that the first distributed data manager can receive a LUN outputted by the first IO stack; initiating a communication between the first distributed data manager and a second distributed data manager associated with a second data storage system at a second location; in response to establishing a communication between the first and second distributed data managers, migrating stored data on the first data storage system to the second data storage system; and in response to establishing a communication between the first and second distributed data managers, providing LUN information associated with the stored data to the second data storage system such that a LUN identify of the migrated data stored on the second data storage system is similar to a LUN identity of the corresponding stored data on the first data storage system.

BRIEF DESCRIPTION OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

DETAILED DESCRIPTION

Embodiments of the invention will now be described. It is understood that such embodiments are provided by way of example to illustrate various features and principles of the invention, and that the invention hereof is broader than the specific example embodiments disclosed.

A unified data path architecture for data processing in a data storage system combines both block-based and file-based functionality. This simplifies design and maintenance and allows a common set of functions to be applied to both block-based and file-based objects. The architecture also enables an increase in storage utilization by reallocating storage units used for block-based objects to file-based objects, and vice-versa, thereby reducing or completely eliminating stranded storage.

U.S. patent application Ser. No. 13/828,322 filed on 14 Mar. 2013 and assigned to EMC Corporation describes the unified data path architecture, and the disclosure therein is hereby incorporated herein by reference in its entirety.

Figure 1:
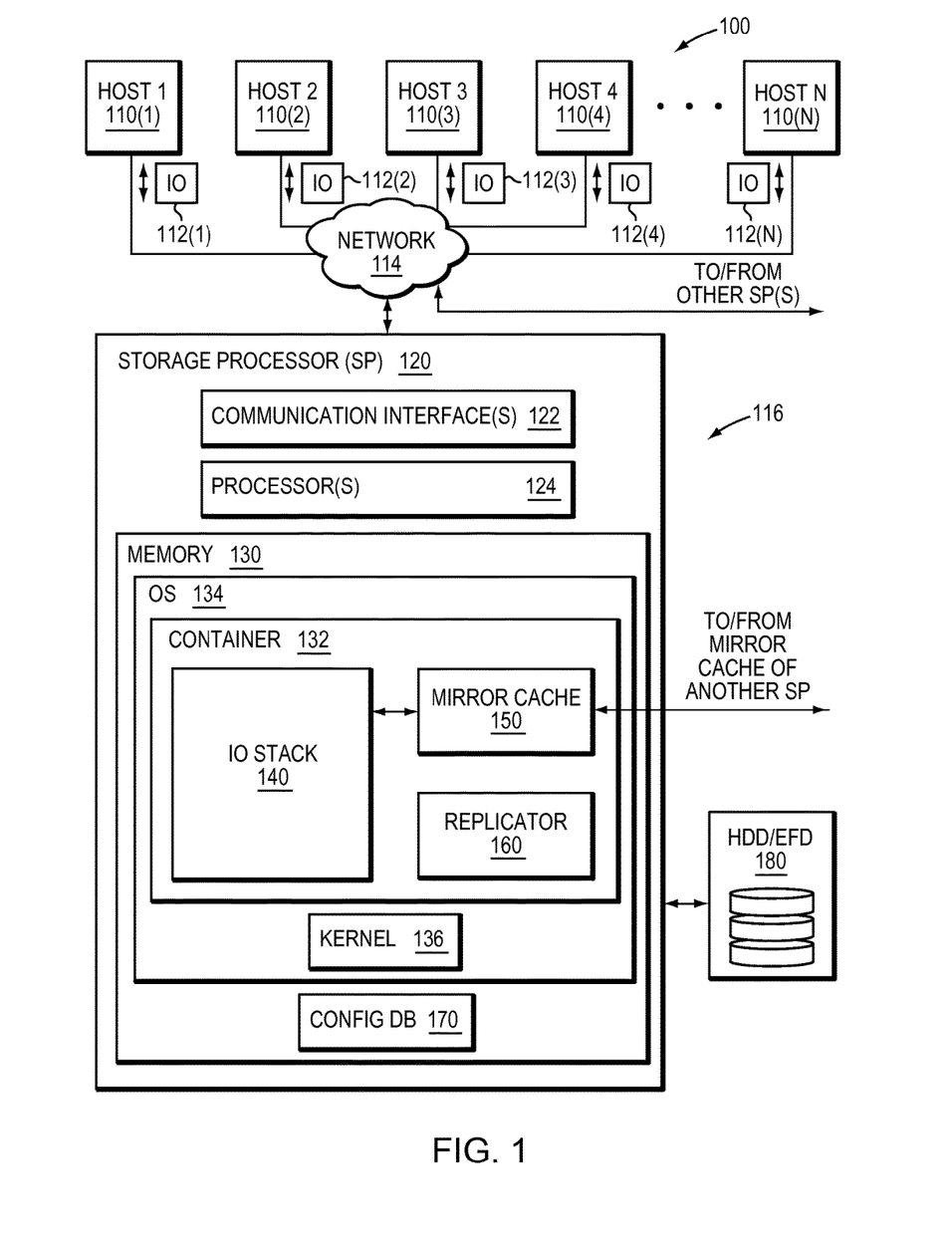
FIG. 1 is a block diagram showing an example storage processor of a data storage system in an example environment wherein improved techniques hereof may be practiced.

FIG. 1 shows an example environment 100 in which embodiments of the improved technique hereof can be practiced. Here, multiple host computing devices ("hosts"), shown as devices 110(1) through 110(N), access a data storage system 116 over a network 114. The data storage system 116 includes a storage processor, or "SP," 120 and storage 180. The storage 180 is provided, for example, in the form of hard disk drives and/or electronic flash drives. Although not shown in FIG. 1, the data storage system 116 may include multiple SPs like the SP 120. For instance, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs (including a single one) can be provided and the SP 120 can be any type of computing device capable of processing host IOs.

The network 114 can be any type of network or combination of networks, such as a storage area network (SAN), local area network (LAN), wide area network (WAN), the Internet, and/or some other type of network, for example. In an example, the hosts 110(1-N) connect to the SP 120 using various technologies. For example, the hosts 110 can connect to the SP 120 using Fibre Channel (e.g., through a SAN). The SP 120 is configured to receive IO requests 112(1-N) and to respond to such IO requests 112(1-N) by reading or writing the storage 180.

The SP 120 is seen to include one or more communication interfaces 122, a set of processors 124, and memory 130. The communication interfaces 122 include, for example, adapters, such as SCSI target adapters and network interface adapters, for converting electronic and/or optical signals received from the network 114 to electronic form for use by the SP 120. The set of processors 124 includes one or more processing chips and/or assemblies. In a particular example, the set of processors 124 includes numerous multi-core CPUs. The memory 130 includes both volatile memory (e.g., RAM), and non-volatile memory, such as one or more ROMs, disk drives, solid state drives (SSDs), and the like. The set of processors 124 and the memory 130 together form control circuitry, which is constructed and arranged to carry out various methods and functions as described herein. Also, the memory 130 includes a variety of software constructs realized in the form of executable instructions. When the executable instructions are run by the set of processors 124, the set of processors 124 are caused to carry out the operations of the software constructs. Although certain software constructs are specifically shown and described, it is understood that the memory 130 typically includes many other software constructs, which are not shown, such as various applications, processes, and daemons.

As shown, the memory 130 includes an operating system 134, such as Unix, Linux, or Windows™, for example. The operating system 134 includes a kernel 136. The memory 130 further includes a container 132. In an example, the container 132 is a software process that provides an isolated userspace execution context within the operating system 134. In various examples, the memory 130 may include multiple containers like the container 132, with each container providing its own isolated userspace instance. Although containers provide isolated environments that do not directly interact (and thus promote fault containment), different containers can run on the same kernel 136 and can communicate with one another using inter-process communication (IPC) mediated by the kernel 136. Containers are well-known features of Unix, Linux, and other operating systems.

In the example of FIG. 1, only a single container 132 is shown. Running within the container 132 is an IO stack 140, a mirror cache 150, and a replicator 160. The IO stack 140 provides an execution path for host IOs (e.g., 112(1-N)). The mirror cache 150 stores data for incoming writes and mirrors the data to cache on another SP. The replicator 160 makes local and/or remote copies of data for incoming writes. As the IO stack 140, mirror cache 150, and replicator 160 all run within the same container 132, the IO stack 140, mirror cache 150, and replicator 160 can communicate with one another using APIs (application program interfaces), i.e., without the need to use IPC.

The memory 130 also stores a configuration database 170. The configuration database 170 stores system configuration information. In other implementations, the configuration database 170 is stored elsewhere in the data storage system 116, such as on a disk drive separate from the SP 120 but accessible to the SP 120, e.g., over a backplane or network.

In operation, the hosts 110(1-N) issues IO requests 112 (1-N) to the data storage system 116. The SP 120 receives the IO requests 112(1-N) at the communication interfaces 122 and passes the IO requests to the IO stack 140 for further processing. The processing may include caching data provided with any write IO requests to the mirror cache 150, which may in turn cache the data to another SP. Also, mapping operations map LUNs to underlying files stored in a set of internal file systems. Host IO requests received for reading and writing LUNs are thus converted to reads and writes of respective files. The IO requests then propagate through the stack and the commands are executed for reading and/or writing the physical storage 180.

Figure 2:
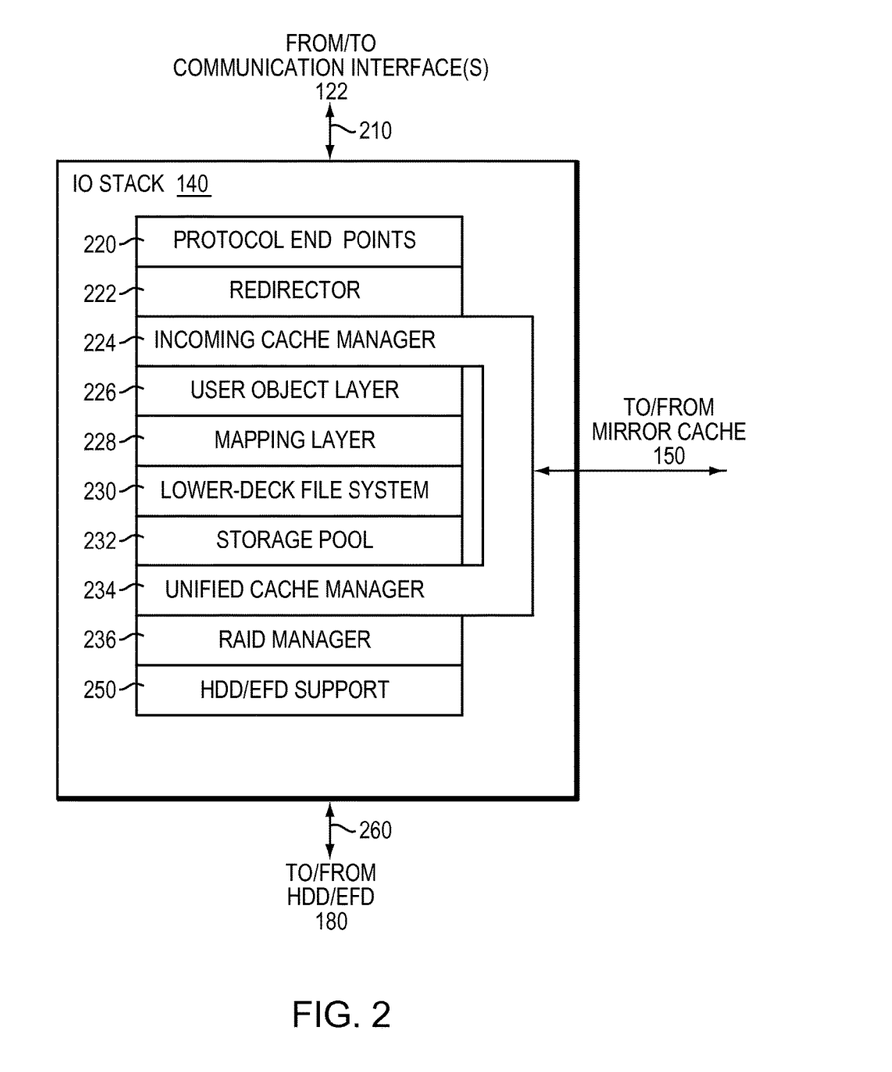
FIG. 2 is a block diagram showing particular example features of the storage processor of FIG. 1, including an IO stack.

FIG. 2 shows the IO stack 140 in additional detail. Here, the IO stack 140 is seen to include protocol end points 220, a redirector 222, an incoming cache manager 224, a user object layer 226, a mapping layer 228, one or more lower-deck (internal) file systems 230, a storage pool 232, a unified cache manager 234, a RAID (Redundant Array of Independent Disks) manager 236, and hard disk drive/electronic flash drive support 250.

The protocol end points 220 receive the host IO requests 210 from the communication interfaces 122 and perform protocol-specific processing, such as stripping off header information and identifying data payloads. Processing then continues to the redirector 222.

The redirector 222 receives the host IOs and, under specified conditions, redirects the host IO requests to another SP. For example, the LUN specified in any block-based host IO request may be owned by a particular SP of the data storage system 116. If the SP 120 receives a host IO request that is directed to a LUN owned by another SP, the redirector 222 sends the host IO to the SP that owns the LUN, at which point processing of the host IO request by the SP 120 ceases. However, if the redirector 222 detects that the LUN specified in a block-based host IO request is owned by the SP 120, the redirector allows the host IO request to continue to propagate through the front end 142. For host IO requests that are not redirected, processing continues to the incoming cache manager 224.

The incoming cache manager 224 provides low-latency responses to incoming host IO write requests. When a write IO request is received, the incoming cache manager 224 caches the data specified by the write request in the mirror cache 150. Operating in conjunction with the unified system cache 234, the incoming cache manager 224 directs the contents of the mirror cache 150 to be copied over a high-speed interconnect (e.g., a high-speed cable or bus) to a cache of a second SP of the data storage system, where a duplicate copy of the data is stored. The data specified by the host write IO request are thus stored in two independent locations and are deemed to be persisted. Upon confirmation that the data have been successfully written to both the mirror cache 150 and the cache of the other SP, the incoming cache manager 224 acknowledges the write back to the originating host (i.e., the host of 110(1-N) that sent the write host IO). Using this arrangement, write requests are acknowledged quickly, without the need to wait until the requests propagate to the actual storage 180 or even to the unified cache manager 234, thereby providing a low level of latency in responding to write IOs. The data stored in the mirror cache 150 may eventually be destaged to the storage 180 (e.g., to the set of slices that store the LUN), but such destaging may be conducted when convenient and out of band with the processing of host IOs. Processing continues to the incoming user object layer 226.

The user object layer 226 presents underlying files representing LUNs in a form recognized by the hosts (i.e., as LUNs). For example, the user object layer 226 presents data stored in underlying files for block-based data as LUNs.

Additionally, it should be appreciated that the user object layer 226 of the type of stack as described herein can also present data stored in underlying files for file-based data as host file systems. This aspect will not be described in any detail in this particular disclosure.

The mapping layer 228 maps host objects as presented in the user object layer 226 to corresponding underlying files stored in one or more lower-deck file systems 230. For LUNs, the mapping layer 228 converts a LUN identifier and offset range to a particular file in a lower-deck file system 230 and to a particular offset range within that file. Any set of blocks of a LUN identified in a host IO request are thus mapped to a set of blocks in the underlying file that represents the LUN.

The lower-deck file system layer 230 represents LUNs in the form of files. Any number of lower-deck file systems 230 may be provided. In one arrangement, a single lower-deck file system 230 may be provided to include any number of LUNs, as well as their snaps (i.e., point-in-time copies). In another arrangement, a different lower-deck file system is provided for each primary object to be stored, i.e., for each LUN. The lower-deck file system for any primary object may include a file storing the object itself, as well as files storing any snaps of the object. Each lower-deck file system 230 has an inode table, which provides a unique inode for each file stored in the lower-deck file system 230. The inode table of each lower-deck file system stores properties of each file in the respective lower-deck file system, such as ownership and block locations at which the file's data are stored. Lower-deck file systems are built upon storage elements managed by a storage pool 232.

The storage pool 232 organizes elements of the storage 180 in the form of slices. A "slice" is an increment of storage space, such as 256 MB in size, which is drawn from the storage 180. The pool 232 may allocate slices to lower-deck file systems 230 for use in storing their files. The pool 232 may also deallocate slices from lower-deck file systems 230 if the storage provided by the slices is no longer required. In an example, the storage pool 232 creates slices by accessing RAID groups formed from the storage 180, dividing the RAID groups into FLUs (Flare LUNs), and further dividing the FLU's into slices.

The unified cache manager 234 provides caching services for data stored in the lower-deck file systems 230. In some examples, the unified cache manager 234 directs data specified by host writes to local RAM or flash memory and thus avoids the need to access the storage 180, which is typically more remote than the local RAM or flash memory and takes more time to access. In some examples, the unified cache manager 234 also directs data returned in response to read IO requests to be stored in local RAM or flash memory for fast access in the event that subsequent host IO requests require the same data. In some examples, the local RAM or flash memory may store the only valid copy of host data, with writes to the storage 180 being deferred and, in cases where host data needs to be stored only transiently, avoided altogether.

The RAID manager 252 accesses the particular slice or slices being written or read using RAID protocols. In some examples, the RAID manager 252 also performs out-of-band operations of maintaining RAID groups, such as swapping out failing disk elements and applying erasure coding to restore required redundancy.

The hard disk drive/electronic flash drive support 254 includes drivers that perform the actual reading from or writing to the storage 180.

Although the above-described components of the IO stack 140 are presented in a particular order, this order can be varied. For example, the incoming cache manager 224 can be located above the redirector 222. Also, multiple cache managers can be provided at different locations within the IO stack 140.

Figure 3:
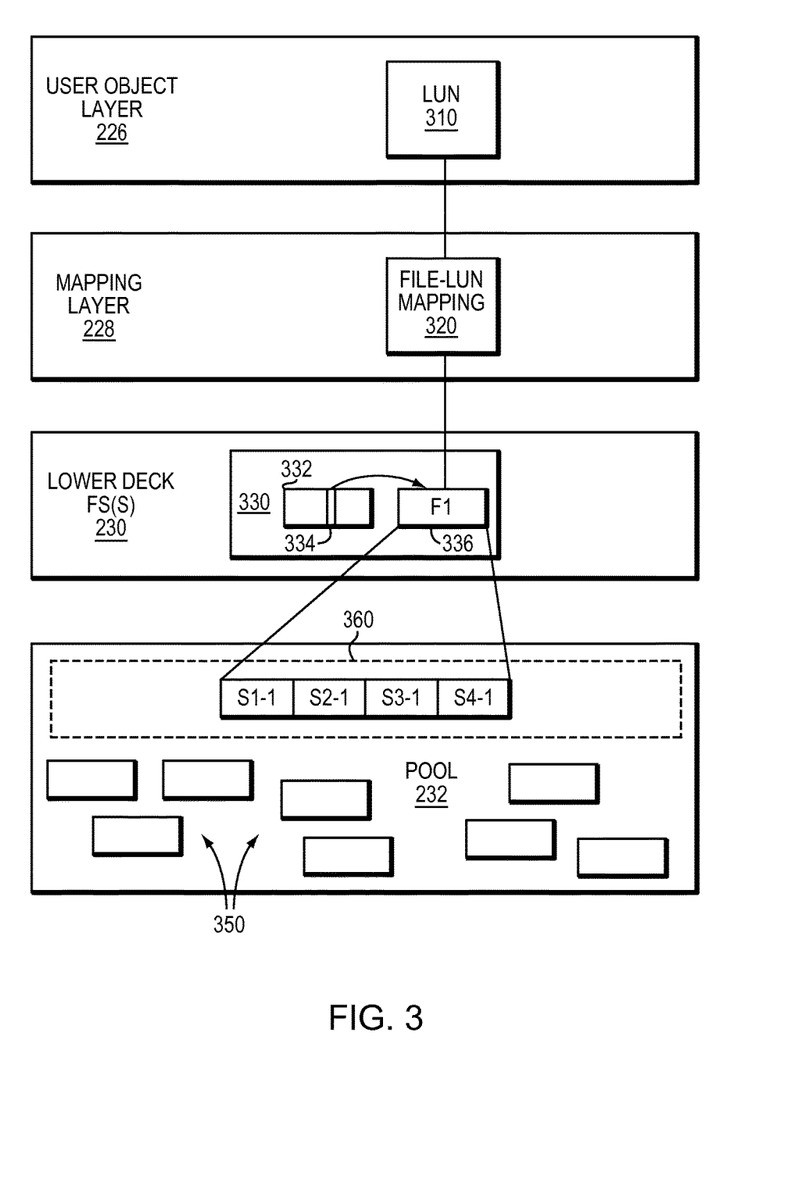
FIG. 3 is a block diagram showing example features of FIG. 2 in additional detail, including lower-deck file systems built upon storage units (e.g., slices) from a storage pool.

FIG. 3 shows portions of the front end 142 in additional detail. Here, the user object layer 226 includes a representation of a LUN 310, and the mapping layer 228 includes a file-to-LUN mapping 320. The file-to-LUN mapping 320 maps the LUN 310 to a first file F1 (336). Through the file-to-LUN mapping 320, any set of blocks identified in the LUN 310 by a host IO is mapped to a corresponding set of blocks within the first file 336.

The first file 336 is included within the lower-deck file systems 230. In this example, a first lower-deck file system 330 includes the first file 336. The lower-deck file system 330 includes an inode table 332. The inode table 332 provides information about files in respective lower-deck file systems in the form of inodes. For example, the inode table 332 of the first lower-deck file system 330 includes an inode 334, which provides file-specific information about the first file 336. The information stored in the inode includes location information (e.g., block locations) where the respective file is stored, and may thus be accessed as metadata to identify the locations of the file 336.

Although a single file is shown for each of the lower-deck file system 330, it is understood that the lower-deck file system 330 may include any number of files, each with its own entry in the respective inode table. In one example, each lower-deck file system stores not only the file F1 for the LUN 310, but also snaps of those objects. For instance, the first lower-deck file system 330 stores the first file 336 along with a different file for every snap of the LUN 310.

As shown, a set of slices 360 is allocated by the storage pool 232 for storing the first file 336 and the second file 346. In the example show, slices S1-1 through S4-1 are used for storing the first file 336. The data that make up the LUN 310 are thus stored in the slices S1-1 through S4-1. In an example, the storage pool 232 allocates slices 350 to the file system 230 in an on-demand manner, e.g., as the first file 236 requires additional storage. The storage pool 232 can also deallocate slices from the file system 230 when all the currently allocated slices are no longer required.

In some examples, the lower-deck file systems 330 is associated with a respective volume, such as a sparse LUN. Sparse LUNs provide an additional layer of mapping between the lower-deck file system 230 and the pool 232 and allow the lower-deck file system to operate as file systems normally do, by accessing underlying volumes. Additional details about sparse LUNs and their relation to lower-deck file systems may be found in U.S. Pat. No. 7,631,155, which is hereby incorporated by reference in its entirety. The incorporated patent uses the term "container file systems" to refer to constructs similar to the lower-deck file systems disclosed herein.

Figure 4:
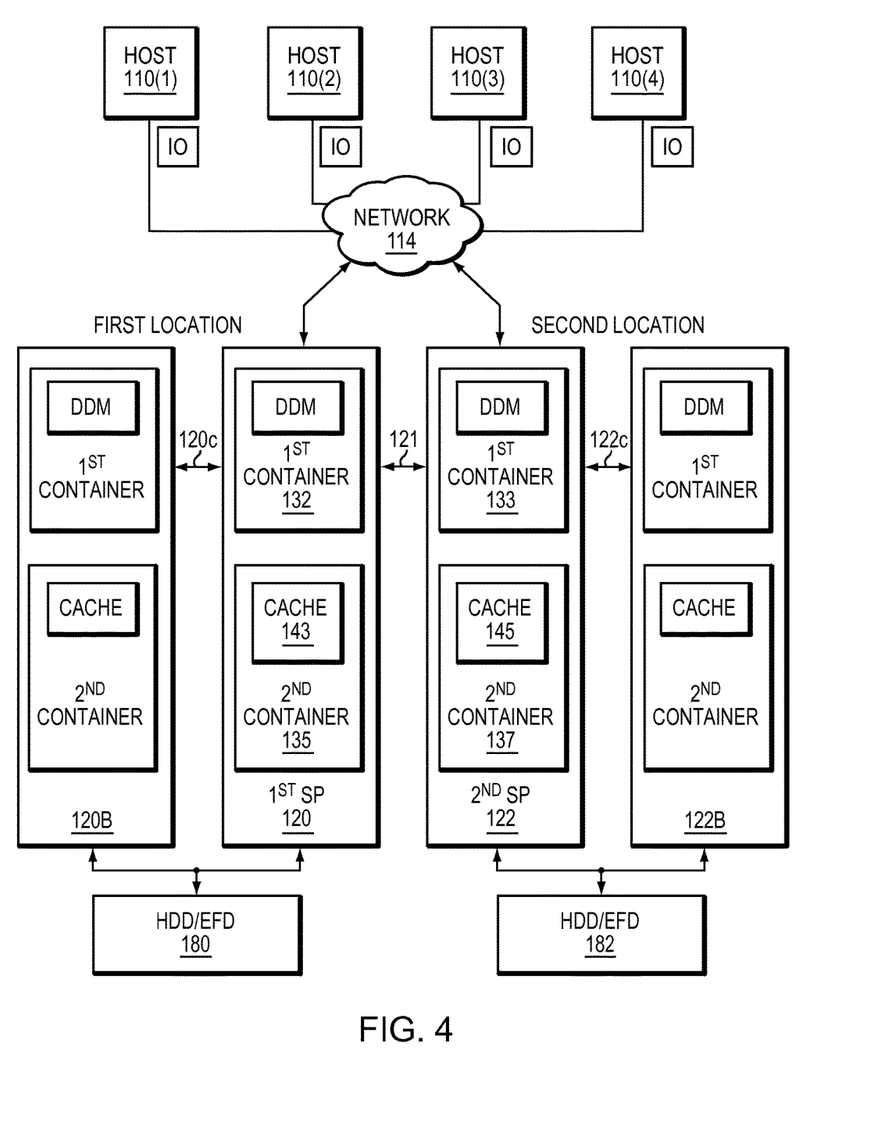
FIG. 4 is a block diagram of an example arrangement of multiple storage processors operating to perform migration of data.

FIG. 4 is a block diagram of an example arrangement for enabling migration of data between a first data storage system (i.e., source system) and a second data storage system (i.e., destination system) at respective first and second locations. The example arrangement provides for a block storage transparent platform migration while hiding the internal complexity from the end user. Here, a first storage processor (SP) 120 (i.e., the same SP as in FIG. 1) is shown coupled to a HDD/EFD 180 (i.e., the same as in FIG. 1) at a first location (also referred to as a site). The SP 120 has a companion SP 120B, which is also coupled to the HDD/EFD 180. The SP 120B may be provided alongside the SP 120 in a single cabinet of the legacy first data storage system 116 and connected to the SP 120 via an interconnect 120c, such as a PCI Express cable, for example.

The SP 120 is seen to include a first container 132 (i.e., the same as in FIG. 1) and a second container 135. Each container provides an isolated userspace instance. Operating within the first container 132 is a distributed data manager (DDM). Operating within the second container 135 is IO stack, e.g. similar to the stack 140 shown in FIGS. 1 and 2. The $2^{ND}$ container 135 includes a cache 143.

The arrangement of the DDM in the container at the front end of the storage processor allows the stack to communicate with the DDM such that LUNs provided by the stack are consumed by the DDM. The arrangement of the DDM in the first container also enables the DDM to be hidden to the end-users for ease of management with respect to LUN lifecycle management. Furthermore, all of the stack data services such as block deduplication, block compression, auto-tiering, may also be leveraged.

Additionally, the above arrangement embeds the DDM in the processor with the stack, thereby minimizing footprint through hardware consolidation.

At the second location, a second SP 122 is shown coupled to HDD/EFD 182. The SP 122 has a companion SP 122B, which is also coupled to the HDD/EFD 182. The SP 122B may be provided alongside the SP 122 in a single cabinet of a data storage system at the second location and connected to the SP 122 via an interconnect 122c. It should be understood that the second system may be a newly added destination system.

The second SP 122 is configured with first and second containers 133 and 137, respectively, where the container 137 includes a cache 145. The second SP 122 is configured in a similar manner to the SP 120.

The first location may be local to or remote from the second location. For example, the first and second locations may be different locations within the same room or building, or they may be geographically separated locations, such as in different buildings, which may be on different streets or different cities. In an example, the data storage system 116 at the first location is connected to the data storage system at the second location via the network 114. The data storage systems may also be connected using connection 121 (alternatively, the connection 121 may be considered to be part of the network 114).

In one example, the SPs 120 and 120B are part of a first local cluster of SPs, which may also include additional SPs (not shown) at the first location. The SPs 122 and 122B are part of a second local cluster of SPs, which may also include additional SPs at the second location. The first and second local clusters may together be regarded as forming a wide area cluster, i.e., a metro cluster.

DDMs in the first containers can be VPLEX products available from EMC Corporation of Hopkinton, Mass. The DDMs may be used to enable the resources of the two disparate data storage systems at the first and second locations to be federated and/or coordinated and utilized as a single pool of virtual storage. The DDMs may also allow for logical storage units (e.g., logical unit numbers (LUNs)), provisioned from various storage systems, to be managed through a centralized management interface.

As mentioned above, the above example arrangement enables migration of data between the source system and the destination system. It should be understood once the destination system is added to the arrangement the DDMs in the respective systems can cooperate in order to assist in replicating the source configuration on the newly installed destination system. When the configuration is complete, the DDMs can establish a mirror relationship between the LUNs on the source system and the corresponding LUNs on the destination system. Additionally, the DDMs ensure that each of the LUN pair across source and destination systems have the same LUN identity.

Once all the LUNs on the source system are mirrored with LUNs on the destination system, the user can decide at any time to switchover to the destination system. Post switchover, the destination system can take over the personality of the source system but the mirror may still be maintained with the source system to allow for rollback if the user doesn't like what they get on the destination system. If the user is satisfied after switching over to the destination system, the source system may be retired from the arrangement.

It should be understood that the establishment of a mirror relationship between the LUNs on the source system and the corresponding LUNs on the destination system may be carried out in many different ways. However, an example data mirroring sequence is described below with respect to FIG. 4. This example may comprise at least the following steps.

Step (1) comprises the first SP 120 requesting stored data (and associated configuration information) to be provided to the DDM in the first container 132. Step (2) comprises the DDM in the first SP 120 initiates a mirroring operation by directing the stored data (and associated configuration information) to the DDM at the second location. Step (3), the DDM in the first container 133 on the second SP 122 passes the data to the IO stack in the storage processor 122. Step (4), storage processor 122 initiates storage of the data in the HDD/EFD 182. Step (5), storage processor 122 sends acknowledgment to the storage processor 120 that the data has been stored in the HDD/EFD 182. The above steps are repeated until all the stored data in the source storage system is migrated to the destination storage system. Step (6), the DDMs establish a mirror relationship between LUNs on the source system and corresponding LUNs on the destination system and ensures that each of the LUN pair across source and destination systems have the same LUN identity.

When all the LUNs in use have a mirror established with the destination system, the user has the option at any time to break the mirror relationship and remove the source system from the configuration entirely transparently and with no interruption whatsoever from the hosts perspective.

It should be noted that in this example the destination data storage system has a similar architecture to the source data storage system. However, in certain embodiments this need not be the case.

Figure 5:
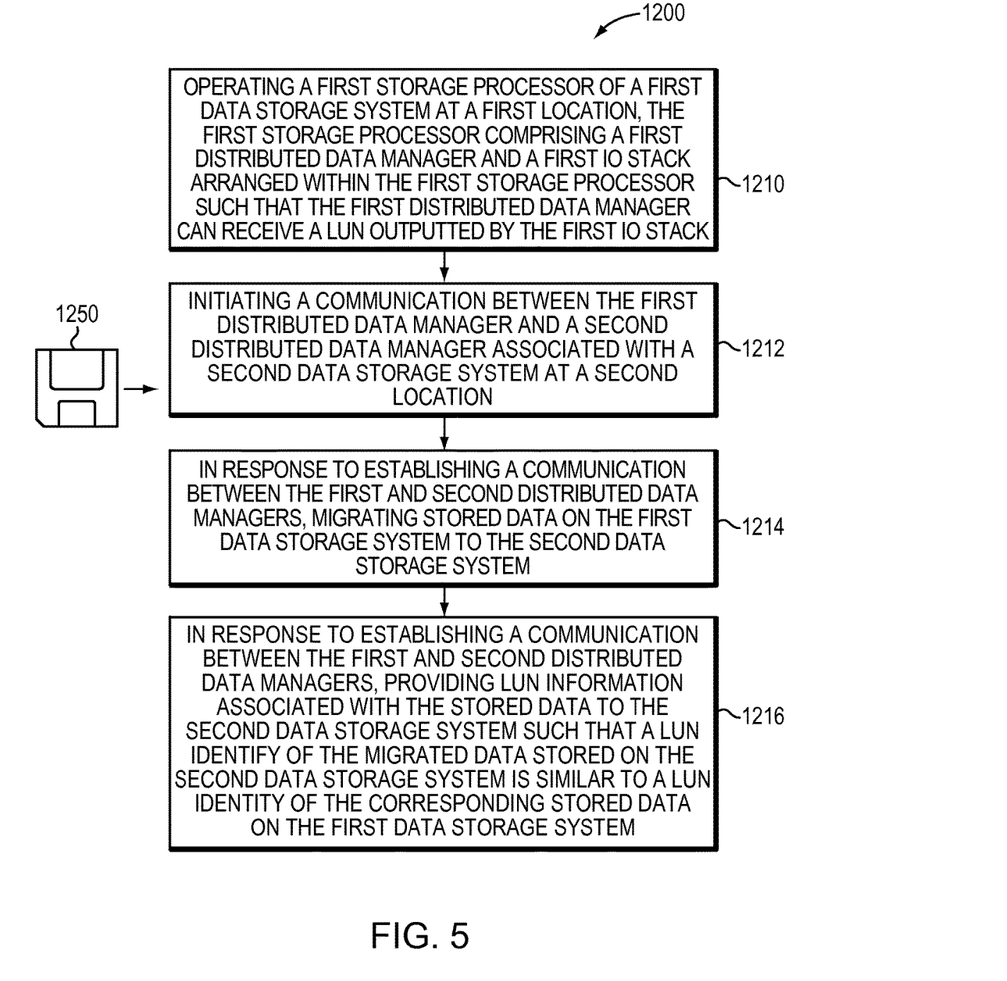
FIG. 5 is a flowchart showing an example process for managing data storage.

FIG. 5 shows an example method 1200. The method 1200 is typically performed by the software constructs as shown in FIGS. 1, 2, and 4. The various acts of the method 1200 may be ordered in any suitable way. Accordingly, embodiments may be constructed in which acts are performed in orders different from those illustrated, which may include performing some acts simultaneously, even though the acts are shown as sequential in the illustrated embodiments.

FIG. 5 shows an example method 1200 of managing data storage. The method 1200 may be performed in connection with the arrangement shown in FIG. 4.

At step 1210, the step comprises operating a first storage processor of a first data storage system at a first location. The first storage processor comprising a first distributed data manager and a first IO stack arranged within the first storage processor such that the first distributed data manager can receive a LUN outputted by the first IO stack. It should be appreciated from the previous figure that the first distributed data manager can be arranged in a container at a front end of the first storage processor such that a LUN outputted by the IO stack can be received by the first distributed data manager.

At step 1212, the step comprises initiating a communication between the first distributed data manager and a second distributed data manager associated with a second data storage system at a second location. The DDM initiates the communication.

At step 1214, the step comprises migrating stored data on the first data storage system to the second data storage system in response to establishing a communication between the first and second distributed data managers. The DDM facilitates the communication.

At step 1216, the step comprises providing LUN information associated with the stored data to the second data storage system such that a LUN identify of the migrated data stored on the second data storage system is similar to a LUN identity of the corresponding stored data on the first data storage system in response to establishing a communication between the first and second distributed data managers. The DDM provides the LUN information.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments. In addition, the word "set" as used herein indicates one or more of something, unless a statement is made to the contrary.

Having described certain embodiments, numerous alternative embodiments or variations can be made. For example, the improvements or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as media 1250 in FIG. 5). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further, although features are shown and described with reference to particular embodiments hereof, such features may be included in any of the disclosed embodiments and their variants. Thus, it is understood that features disclosed in connection with any embodiment can be included as variants of any other embodiment, whether such inclusion is made explicit herein or not.

Those skilled in the art will therefore understand that various changes in form and detail may be made to the embodiments disclosed herein without departing from the scope of the invention.

What is claimed is:

1. A computer-implemented method, comprising:
    operating an IO (Input/Output) stack within a first storage processor (SP) of a first data storage system at a first location, the IO stack operating within the first SP including (i) a first container including a first distributed data manager (DDM) and (ii) a second container including a mapping layer, the first DDM in the first container receiving a LUN served by one or more storage devices via the mapping layer in the second container and providing a host-accessible LUN;
    establishing a communication between the first DDM and a second distributed data manager (DDM) included as part of an IO stack within a second SP of a second storage system at a second location; and
    in response to establishing the communication between the first DDM and the second DDM, replicating the host-accessible LUN associated with the first storage system on the second storage system and forming a mirror relationship between the host-accessible LUN on the first storage system and the corresponding LUN on the second storage system, wherein the host-accessible LUN and the corresponding LUN comprise a similar identifier across the first and second storage systems;

wherein the first and second DDMs facilitate the establishment of the mirror relationship such that it enables one of the first and second storage systems to be removed from the relationship without interruption to a host with access the host-accessible LUN;

wherein the first container is a first software process running on an operating system kernel of the first SP and providing a first isolated userspace environment on the first SP;

wherein the second container is a second software process running on the operating system kernel of the first SP and providing a second isolated userspace environment on the first SP; and wherein the first container and the second container communicate with each other using inter-process communication (IPC) within the first SP.

2. The method as claimed in claim 1, wherein the second distributed data manager is arranged in a second storage processor of the second data storage system, the second data storage system comprising the second distributed data manager and a second IO stack arranged within the second storage processor such that the second distributed data manager can receive a LUN outputted by the second IO stack.

3. The method as claimed in claim 1, wherein the first and second distributed data managers communicate over a communications link to facilitate communication therebetween.

4. The method as claimed in claim 1, wherein first IO stack provides a unified data path architecture for data processing in the first data storage system that combines both block-based and file-based functionality.

5. The method as claimed in claim 1, wherein the second data storage system is located remotely of the first data storage system.

6. An apparatus, comprising:
one or more processors; and
a computer-readable medium storing instructions for execution by the one or more processors, the instructions comprising instructions to:
operate an IO (Input/Output) stack within a first storage processor (SP) of a first data storage system at a first location, the IO stack operating within the first SP including (i) a first container including a first distributed data manager (DDM) and (ii) a second container including a mapping layer, the first DDM in the first container receiving a LUN served by one or more storage devices via the mapping layer in the second container and providing a host-accessible LUN;
establish a communication between the first DDM and a second distributed data manager (DDM) included as part of an IO stack within a second SP of a second storage system at a second location; and
in response to establishing the communication between the first DDM and the second DDM, replicate the host-accessible LUN associated with the first storage system on the second storage system and form a mirror relationship between the host-accessible LUN on the first storage system and the corresponding LUN on the second storage system, wherein the host-accessible LUN and the corresponding LUN comprise a similar identifier across the first and second storage systems;

wherein the first and second DDMs facilitate the establishment of the mirror relationship such that it enables one of the first and second storage systems to be removed from the relationship without interruption to a host with access the host-accessible LUN;

wherein the first container is a first software process running on an operating system kernel of the first SP and providing a first isolated userspace environment on the first SP;

wherein the second container is a second software process running on the operating system kernel of the first SP and providing a second isolated userspace environment on the first SP; and wherein the first container and the second container communicate with each other using inter-process communication (IPC) within the first SP.

7. The apparatus as claimed in claim 6, wherein the second distributed data manager is arranged in a second storage processor of the second data storage system, the second data storage system comprising the second distributed data manager and a second IO stack arranged within the second storage processor such that the second distributed data manager can receive a LUN outputted by the second IO stack.

8. The apparatus as claimed in claim 6, wherein the first and second distributed data managers communicate over a communications link to facilitate communication therebetween.

9. The apparatus as claimed in claim 6, wherein first IO stack provides a unified data path architecture for data processing in the first data storage system that combines both block-based and file-based functionality.

10. The apparatus as claimed in claim 6, wherein the second data storage system is located remotely of the first data storage system.

11. A computer program product having a non-transitory computer-readable medium storing instructions, the instructions, when carried out by one or more processors, causing the one or more processors to perform a method of:
operating an IO (Input/Output) stack within a first storage processor (SP) of a first data storage system at a first location, the IO stack operating within the first SP including (i) a first container including a first distributed data manager (DDM) and (ii) a second container including a mapping layer, the first DDM in the first container receiving a LUN served by one or more storage devices via the mapping layer in the second container and providing a host-accessible LUN;
establishing a communication between the first DDM and a second distributed data manager (DDM) included as part of an IO stack within a second SP of a second storage system at a second location; and
in response to establishing the communication between the first DDM and the second DDM, replicating the host-accessible LUN associated with the first storage system on the second storage system and forming a mirror relationship between the host-accessible LUN on the first storage system and the corresponding LUN on the second storage system, wherein the host-accessible LUN and the corresponding LUN comprise a similar identifier across the first and second storage systems;

wherein the first and second DDMs facilitate the establishment of the mirror relationship such that it enables one of the first and second storage systems to be removed from the relationship without interruption to a host with access the host-accessible LUN;

wherein the first container is a first software process running on an operating system kernel of the first SP and providing a first isolated userspace environment on the first SP;

wherein the second container is a second software process running on the operating system kernel of the first SP and providing a second isolated userspace environment on the first SP; and wherein the first container and the second container communicate with each other using inter-process communication (IPC) within the first SP.

12. The computer program product as claimed in claim 11, wherein the second distributed data manager is arranged in a second storage processor of the second data storage system, the second data storage system comprising the second distributed data manager and a second IO stack arranged within the second storage processor such that the second distributed data manager can receive a LUN outputted by the second IO stack.

13. The computer program product as claimed in claim 11, wherein the first and second distributed data managers communicate over a communications link to facilitate communication therebetween.

14. The computer program product as claimed in claim 11, wherein first IO stack provides a unified data path architecture for data processing in the first data storage system that combines both block-based and file-based functionality.

15. The computer program product as claimed in claim 11, wherein the second data storage system is located remotely of the first data storage system.

* * * * *